(12) United States Patent
Jeong et al.

(10) Patent No.: US 7,370,838 B2
(45) Date of Patent: May 13, 2008

(54) MONITOR APPARATUS

(75) Inventors: Jun-soo Jeong, Suwon (KR);
Hyun-jun Jung, Suwon (KR);
Soon-haeng Heo, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 109 days.

(21) Appl. No.: 10/786,235

(22) Filed: Feb. 26, 2004

(65) Prior Publication Data

US 2004/0256523 A1 Dec. 23, 2004

(30) Foreign Application Priority Data

Feb. 26, 2003 (KR) .................. 10-2003-0012046

(51) Int. Cl.
*A47F 5/00* (2006.01)
(52) U.S. Cl. .................. 248/125.7; 248/150; 248/921; 248/922; 361/681
(58) Field of Classification Search ............. 248/371, 248/125.7, 125.9, 150, 917, 919, 921, 922, 248/923; 361/682, 681; 16/342, 331, 332, 16/334
See application file for complete search history.

(56) References Cited

U.S. PATENT DOCUMENTS

| | | | | |
|---|---|---|---|---|
| 6,163,928 A * | 12/2000 | Chung | .................. | 16/342 |
| 6,231,021 B1 * | 5/2001 | Hong | .................. | 248/371 |
| 6,378,830 B1 * | 4/2002 | Lu | .................. | 248/278.1 |
| 6,561,469 B1 * | 5/2003 | Masuda et al. | .................. | 248/163.1 |
| 6,575,419 B1 * | 6/2003 | Masuda et al. | .................. | 248/371 |
| 6,595,481 B1 * | 7/2003 | Huang et al. | .................. | 248/349.1 |
| 6,671,928 B2 * | 1/2004 | Huang | .................. | 16/340 |
| 7,096,536 B2 * | 8/2006 | Johnson | .................. | 16/300 |
| 2004/0211866 A1 * | 10/2004 | Jung et al. | .................. | 248/133 |

FOREIGN PATENT DOCUMENTS

| | | |
|---|---|---|
| JP | 8-214239 | 8/1996 |
| KR | 98-4698 | 3/1998 |
| KR | 20-234588 | 6/2001 |
| KR | 2001-53965 | 7/2001 |
| KR | 20-253576 | 10/2001 |
| KR | 20-279172 | 6/2002 |
| KR | 20-0308508 | 3/2003 |

OTHER PUBLICATIONS

Notice of Official Action issued by the Korean Intellectual Property Office on Oct. 19, 2007 in the corresponding Korean Application No. 10-2003-0012046 (4 pages) (1 page English translation).

* cited by examiner

*Primary Examiner*—Ramon O Ramirez
(74) *Attorney, Agent, or Firm*—Staas & Halsey LLP

(57) ABSTRACT

A monitor apparatus having a monitor main body, and a base member to support the monitor main body includes a stand member placed between the monitor main body and the base member, a base hinge to connect the stand member to the base member, so that the stand member is rotated relative to the base member and folded, and a rotation control unit to prevent and allow a rotation of the stand member relative to the base member. Thus, a package volume of the monitor apparatus is reduced, so that a cost to keep and move the monitor apparatus is saved, and an accident occurred when the stand member is suddenly rotated is prevented.

30 Claims, 7 Drawing Sheets

MONITOR APPARATUS

CROSS-REFERENCE TO RELATED APPLICATIONS

This application claims the benefit of Korean Patent Application No. 2003-12046, filed Feb. 26, 2003, in the Korean Intellectual Property Office, the disclosure of which is incorporated herein by reference.

BACKGROUND OF THE INVENTION

1. Field of the Invention

The present invention relates to a monitor apparatus, and more particularly, to a monitor apparatus improved in a combining structure of a stand member and a base member to support a monitor main body.

2. Description of the Related Art

As shown in FIG. 1, a conventional monitor apparatus 101 includes a base member 105 to lay on a horizontal plane, a monitor main body 103 provided with a screen, a stand member 107 placed between the base member 105 and the monitor main body 103, to support the monitor main body 103 relative to the base member 105, and a monitor hinge 110 to combine the monitor main body 103 to the stand member 107, so that the monitor main body 103 is tilted relative to the base member 105.

The monitor hinge 110 tiltably combines a rear of the monitor main body 103 with an upper part of the stand member 107.

One side of the monitor hinge 110 is combined to a rear of the monitor main body 103, and the other side thereof is rotatably combined to the upper part of the stand member 107. Thus, the monitor main body 103 is tiltable relative to a tilting axis (not shown) of the stand member 107.

The base member 105 occupies a predetermined seating area to support the monitor main body 103 and the stand member 107, and is laid on a horizontal plane such as a table.

The stand member 107 is combined to a bottom of the base member 107 in an upright position, and a top thereof is combined to the monitor main body 103 by the monitor hinge 110.

In light of the above-described configuration, the conventional monitor apparatus 101 is laid on the horizontal plane such as the table by the base member 105 and the stand member 107, and a tilting angle of the monitor main body 103 is adjusted by the monitor hinge 110.

However, in the conventional monitor apparatus, the base member 105 and the stand member 107 are irrotatably combined, thereby causing a problem that a package volume increases, and thus a cost to keep and move the monitor apparatus increases.

SUMMARY OF THE INVENTION

Accordingly, it is an aspect of the present invention to provide a monitor apparatus improved in a combining structure of a stand member and a base member, to support a monitor main body.

Additional aspects and/or advantages of the invention will be set forth in part in the description which follows and, in part, will be obvious from the description, or may be learned by practice of the invention.

The foregoing and/or other aspects of the present invention are achieved by providing a monitor apparatus including a monitor main body, and a base member to support the monitor main body. The monitor apparatus further includes a stand member placed between the monitor main body and the base member, a base hinge to connect the stand member to the base member, so that the stand member is rotated relative to the base member and folded, and a rotation control unit to prevent and allow a rotation of the stand member relative to the base member.

According to an aspect of the invention, the base hinge includes a base bracket combined to the base member, a stand bracket combined to the stand member, and a hinge shaft to rotatably support the stand bracket relative to the base member.

According to an aspect of the invention, the rotation control unit includes a first rotation preventing part provided at the stand bracket, a second rotation preventing part provided at the base bracket, a stopper provided between the first and second rotation preventing parts to prevent the stand bracket from being rotated relative to the base bracket, and an operating lever to separate the stopper from a space between the first and second rotation preventing parts, so that the stand bracket is rotated relative to the base bracket.

According to an aspect of the invention, the first and second rotation preventing parts are provided in front of the stand bracket and the base bracket, respectively.

According to an aspect of the invention, one end of the operating lever is combined to the stopper and the other end thereof protrudes toward a backside of the base hinge.

According to an aspect of the invention, the rotation control unit further includes a spring member to supply an elastic force, so that the stopper is located between the first and second rotation preventing parts.

According to an aspect of the invention, the operating lever passes through the base bracket in backward and frontward directions, and the spring member includes a coil spring having a first end supported by the base bracket and a second end supported by the operating lever, to push the operating lever backward.

According to an aspect of the invention, the monitor apparatus includes a roller combined to the base bracket and in rolling-contact with a part of the base bracket when the stand bracket is rotated relative to the base bracket.

According to an aspect of the invention, opposite sides of the stand bracket are provided with a pair of hinge shaft supporting parts to support the hinge shaft.

According to an aspect of the invention, the base bracket is provided with a hinge shaft accommodating part provided between the pair of hinge shaft accommodating parts to accommodate the hinge shaft, and a part of the circumferential surface of the hinge shaft accommodating part is provided with a groove of an arc section in rolling-contact with the roller.

According to an aspect of the invention, the monitor apparatus further includes a roller rotation shaft to protrude from opposite sides of the roller. The stand bracket is provided with a rotation shaft supporting part to support the roller rotation shaft, and the rotation shaft supporting part is provided with an elastic member to push the roller in a direction of the hinge shaft accommodating part.

According to an aspect of the invention, the circumferential surface of the hinge shaft accommodating part is provided with a first roller accommodating groove to accommodate the roller when the stand member is stood up relative to the base member, and a second roller accommodating groove to accommodate the roller when the stand member is rotated relative to the base member and folded.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
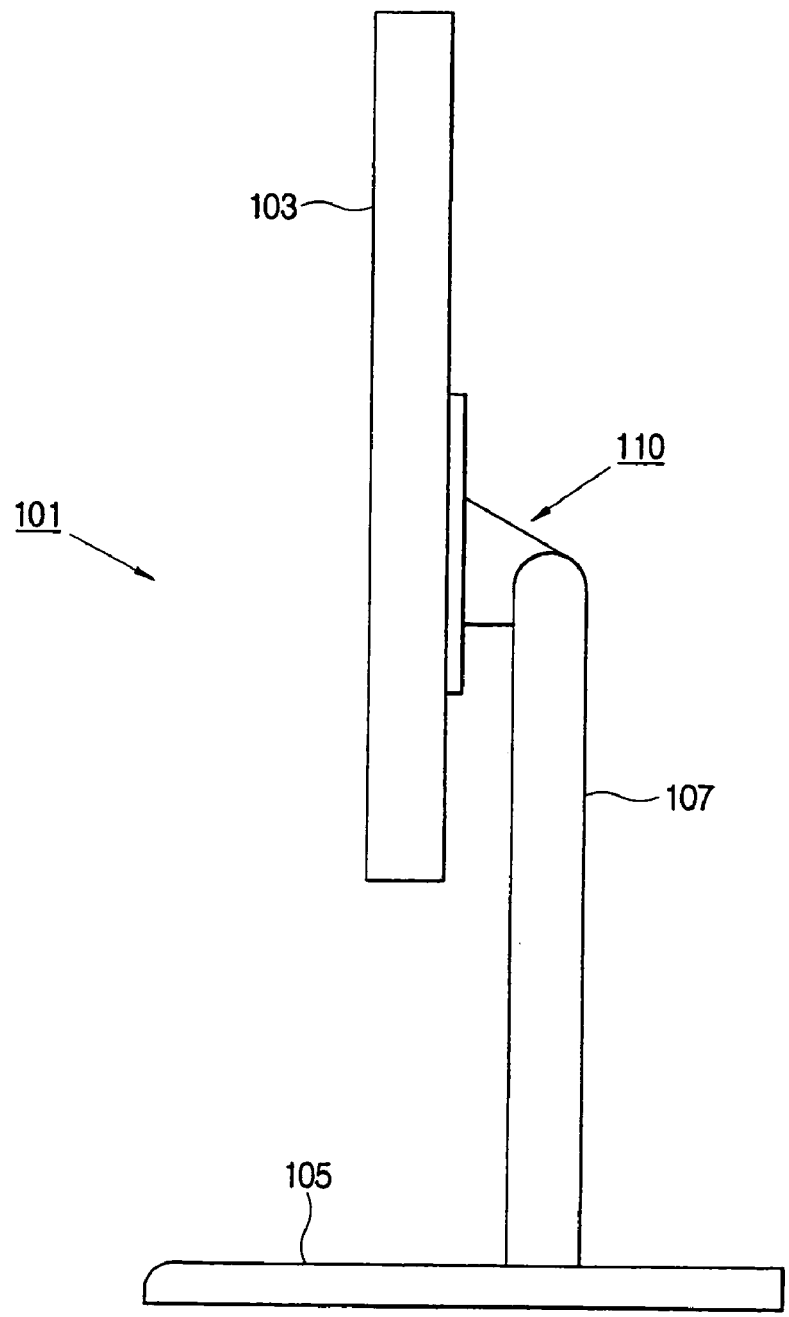
FIG. 1 is a side view of a conventional monitor apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
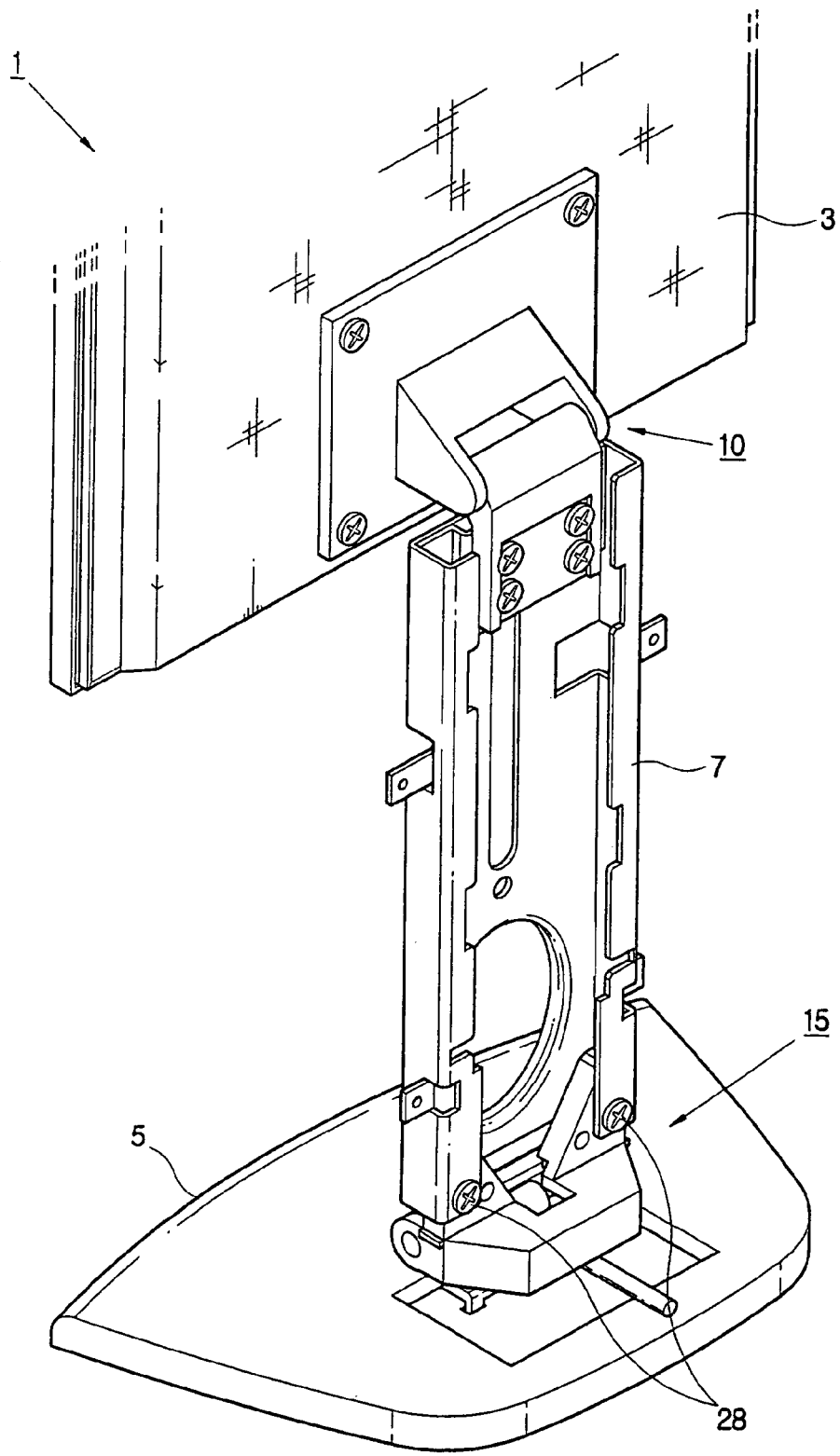
FIG. 2 is a rear prospective view of a monitor apparatus, according to an embodiment of the present invention.
Figure 3:
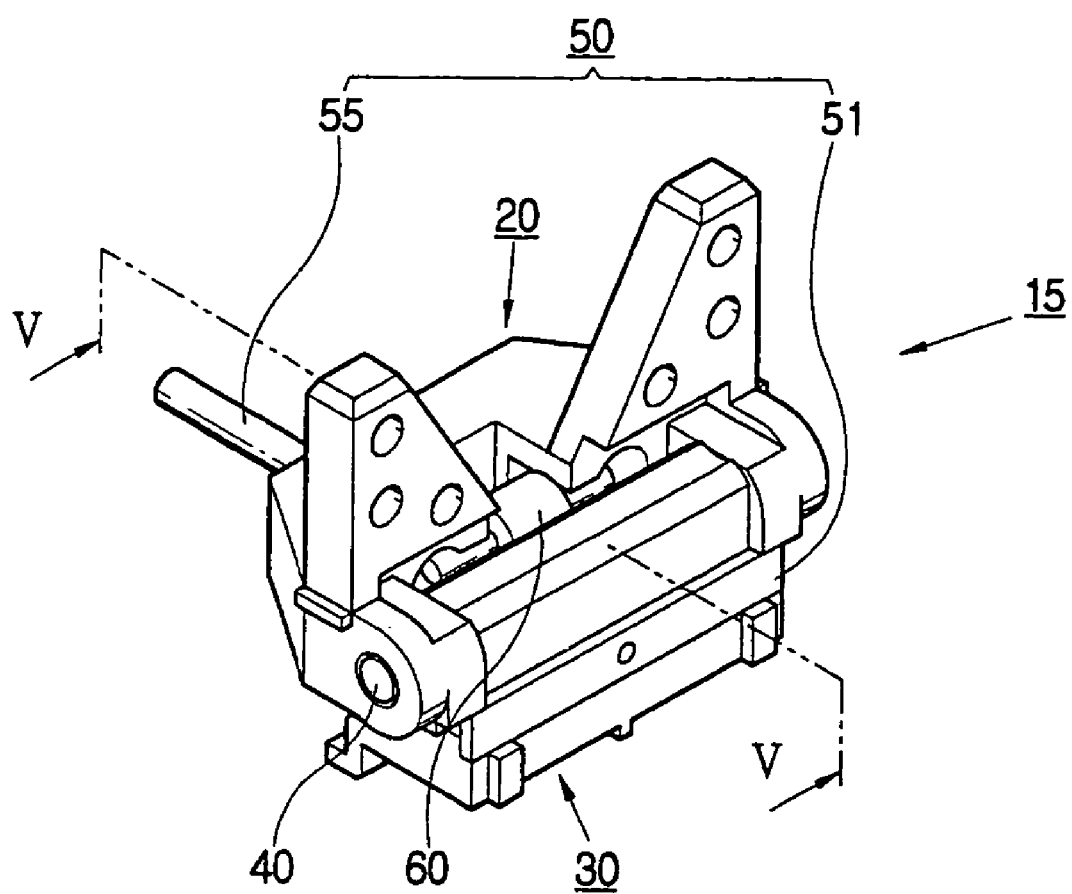
FIG. 3 is a perspective view of a base hinge of the monitor apparatus of FIG. 2.
Figure 4:
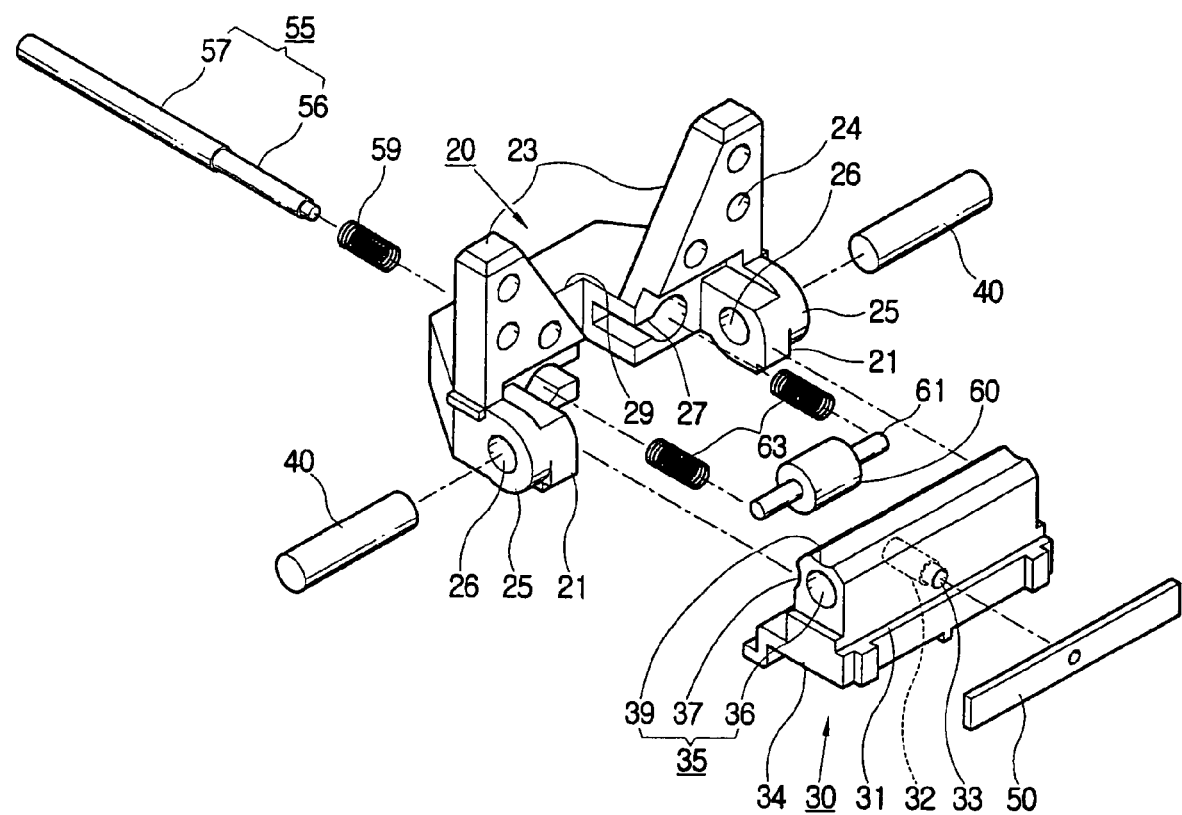
FIG. 4 is an exploded perspective view of the base hinge of the monitor apparatus of FIG. 3.

As shown in FIGS. 2 through 4, a monitor apparatus 1 according to an embodiment of the present invention includes a monitor main body 3 provided with a screen, a base member 5 to support the monitor main body 3, and laid on a horizontal plane such as a table, a stand member 7 located between the monitor main body 3 and the base member 5, a base hinge 15 to connect the base member 5 with the stand member 7, so that the stand member 7 is rotated relative to the base member 5 and folded, and a rotation control unit 50 to prevent and allow a rotation of the stand member 7 relative to the base member 5.

Preferably, a rear of the monitor main body 3 is tiltably combined with an upper part of the stand member 7 by the monitor hinge 10.

One side of the monitor hinge 10 is combined to a rear of the monitor main body 3 and the other side thereof is rotatably combined to the upper part of the stand member 7. Thus, the monitor main body 3 is tiltable relative to the stand member 7 about a tilting axis (not shown).

The base member 5 occupies a predetermined seating area to support the stand member 7 and the monitor main body 3, and is laid on the horizontal plane such as the table to be combined with a base bracket 30 of a base hinge 15 (to be described later).

The stand member 7 is combined approximately in an upright position to the base member 5 by a stand bracket 20 of the base hinge 15 (to be described later), and is forwardly rotated relative to the base member 5 and folded.

The base hinge 15 includes the base bracket 30 combined to the base member 5, the stand bracket 20 combined to the stand bracket 7, a hinge shaft 40 to rotatably support the stand bracket 20 relative to the base bracket 30, and a roller 60 combined to the base bracket 30 and rolling-contacted with a part of the base bracket 30, as the stand bracket 20 is rotated relative to the base bracket 30.

The stand bracket 20 includes a pair of stand combining parts 23 mounted on an upper part thereof and combined to a lower part of the stand member 7, a pair of hinge shaft supporting parts 25 at opposite sides of the stand bracket 20 to support the hinge shaft 40, a roller accommodating part 29 grooved to accommodate the roller 60, and a rotation shaft supporting part 27 to support roller rotation shafts 61 protruding from opposite sides of the roller 60.

The stand combining part 23 is provided with a plurality of combining holes 24, so as to be combined with a lower part of the stand member 7 by screws 28.

The pair of hinge shaft supporting parts 25 is provided with a pair of first shaft inserting holes 26 in which the hinge shaft 40 is inserted along an axial line of a rotation of the stand member 7 and securely combined with the stand member 7.

The roller accommodating part 29 is grooved between the pair of hinge shaft supporting parts 25 to accommodate the roller 60.

The rotation shaft supporting parts 27 are grooved at opposite sides of the roller accommodating part 29 to accommodate the roller rotation shafts 61, and is provided with elastic members 63 to push the roller 60 toward the hinge shaft accommodating part 35 of the base bracket 30 (to be described later).

The elastic members 63 form a pair to be inserted in both sides of the rotation shaft supporting parts 27, and supply an elastic force by which the roller rotation shafts 61 are pushed toward the hinge accommodating part 35 of the base bracket 30 (to be described later). The elastic member 63 may include a coil spring, a plate spring, or rubber.

The base bracket 30 includes at a bottom thereof, a base combining part 34 combined to the base member 5 by screws (not shown), and the hinge shaft accommodating part 35 positioned between the pair of hinge shaft supporting parts 25, to accommodate the hinge shaft 40.

Both sides of the hinge shaft accommodating part 35 are provided with a pair of second shaft inserting holes 36 in which the hinge shafts 40 are rotatably inserted along an axial line of the rotation of the stand member 7. Preferably, the circumferential surface of the hinge shaft accommodating part 35 is partially provided with grooves of arc sections for rolling-contact with the roller 60. The circumferential surface of the hinge shaft accommodating part 35 is preferably provided with a first roller accommodating groove 37 recessed to accommodate the roller 60 before the stand member 7 is rotated relative to the base member 5, and a second roller accommodating groove 39 recessed to accommodate the roller 60 as the stand member 7 is rotated relative to the base member 5 and folded.

The hinge shaft 40 of a circular section 40 forms a pair. Each of the pair of hinge shafts 40 is securely inserted in the first shaft inserting hole 26 and rotatable in the second shaft inserting hole 36. Alternatively, each of the pair of hinge shafts 40 may be rotatably inserted in the first shaft inserting hole 26 and secured in the second shaft inserting hole 36.

The roller 60 in rolling-contact with the circumferential surface of the hinge shaft accommodating part 35 may be made of metal, but preferably, although not required, of plastic or rubber.

Preferably, although not required, the first and second roller accommodating grooves 37 and 39 are of arc sections to correspond to a shape of the roller 60.

If a user pushes the stand member 7 forwardly, the stand bracket 20 combined to the stand member 7 is rotated forwardly relative to the base bracket 30 about the hinge shaft 40, so that the stand member 7 may be folded on a surface of the base member 5.

When the stand bracket 20 is rotated relative to the base bracket 30, the roller 60 is in rolling-contact with the circumferential surface of the hinge shaft accommodating part 35 and is further pushed toward the hinge shaft accommodating part 35 by the elastic members 63, so that the rotation of the stand bracket 20 is supported more stably.

As described above, the circumferential surface of the hinge shaft accommodating part 35 is provided with the first and second roller accommodating parts 37 and 39. Therefore, when the stand member 7 is stood up approximately in an upright position relative to the base member 5 for the user to watch the monitor main body 3, the roller 60 is accommodated in the first roller accommodating groove 37, so as to prevent the rotation of the stand member 7. When the stand member 7 is rotated relative to the base member 5 and folded to pack or move the monitor apparatus 1, the roller 60 is accommodated in the second accommodating groove 39, so as to prevent the rotation of the stand member 7.

The rotation control unit 50 is movably connected to the stand bracket 20 and the base bracket 30 of the base hinge 15. The rotation control unit 50 includes a first rotation preventing part 21 provided at the stand bracket 20, a second rotation preventing part 31 provided at the base bracket 30, and a stopper 51 placed between the first and second rotation preventing parts 21 and 31 to prevent the rotation of the stand bracket 20 relative to the base bracket 30. The rotation control unit 50 also includes an operating lever 55 to separate the stopper 51 from a space between the first and second rotation preventing parts 21 and 31, so that the stand bracket 20 may be rotated relative to the base bracket 30, and a spring member 59 to supply an elastic force, so that the stopper 51 is disposed between the first and second rotation preventing parts 21 and 31.

The first rotation preventing part 21 is placed on a front of the stand bracket 20, and protrudes downwardly in front of the pair of hinge shaft supporting parts 25 provided at both sides of the stand bracket 20, respectively.

The second rotation preventing part 31 is placed on a front of the base bracket 30, and protrudes downwardly in front of the pair of hinge shaft supporting parts 35 provided at both sides of the base bracket 30, respectively.

The stopper 51 is preferably of a plate shape having a width to correspond to a gap created between the first and second rotation preventing parts 21 and 31 when the stand member 7 is stood up relative to the base member 5.

One end of the operating lever 55 is combined with the stopper 51 and the other end thereof protrudes backward from the base hinge 15, frontward and backward therefrom. Further, the base bracket 30 is provided with a lever passing part 32 to slidably pass the operating lever 55 therethrough.

The spring member 59 preferably includes a coil spring. One end of the coil spring is supported by the base bracket 30, and the other end is supported by the operating lever 55.

One side of the operating lever 55 is provided with a spring accommodating part 56 to accommodate the coil spring 59. The other side of the operating lever 55 is provided with an operating part 57 having a diameter longer than those of the spring accommodating part 56 and the coil spring 59, to support the other end of the coil spring 59 and protrude backward from the lever passing part 32.

A front end of the spring accommodating part 56 is combined with the stopper 51 through the spring supporting part 33 of the lever passing part 32 (to be described later).

A rear end of the operating part 57 protrudes backward from the lever passing part 32, so that the user may separate the stopper 51 from the first and second rotation preventing parts 21 and 31 by pushing the rear end of the operating part 57. The rear end of the operating part 57 does not protrude outside of a rear casing (not shown) which forms a rear external appearance of the stand member 7. Therefore, the user may push the rear end of the operating part 57 through a passing hole (not shown) formed in the rear casing with a tool such as a driver. Further, the rear end of the operating part 57 does not exceed the rear casing, thereby providing a fine external appearance and preventing an accident occurring when the stand member 7 is suddenly folded relative to the base member 5 by a mistake of the user.

The lever passing part 32 is employed to insert the operating lever 55 therein and to slide the operating lever 55 frontward and backward therethrough. A front end of the lever passing part 32 is provided with a spring supporting part 33 which passes through the spring accommodating part 56 of the operating lever 55, but does not pass through the coil spring 59, to support one end of the coil spring 59. The lever passing part 32 and the operating lever 55 are of circular sections, but may be of polygonal sections or other shaped sections.

The coil spring 59 is inserted in the spring accommodating part 56 of the operating lever 55. One end of the coil spring 59 is supported by the spring supporting part 33, and the other end is supported by the operating part 57, thereby creating elastic force by which the operating part 57 is pushed backward.

Figure 5:
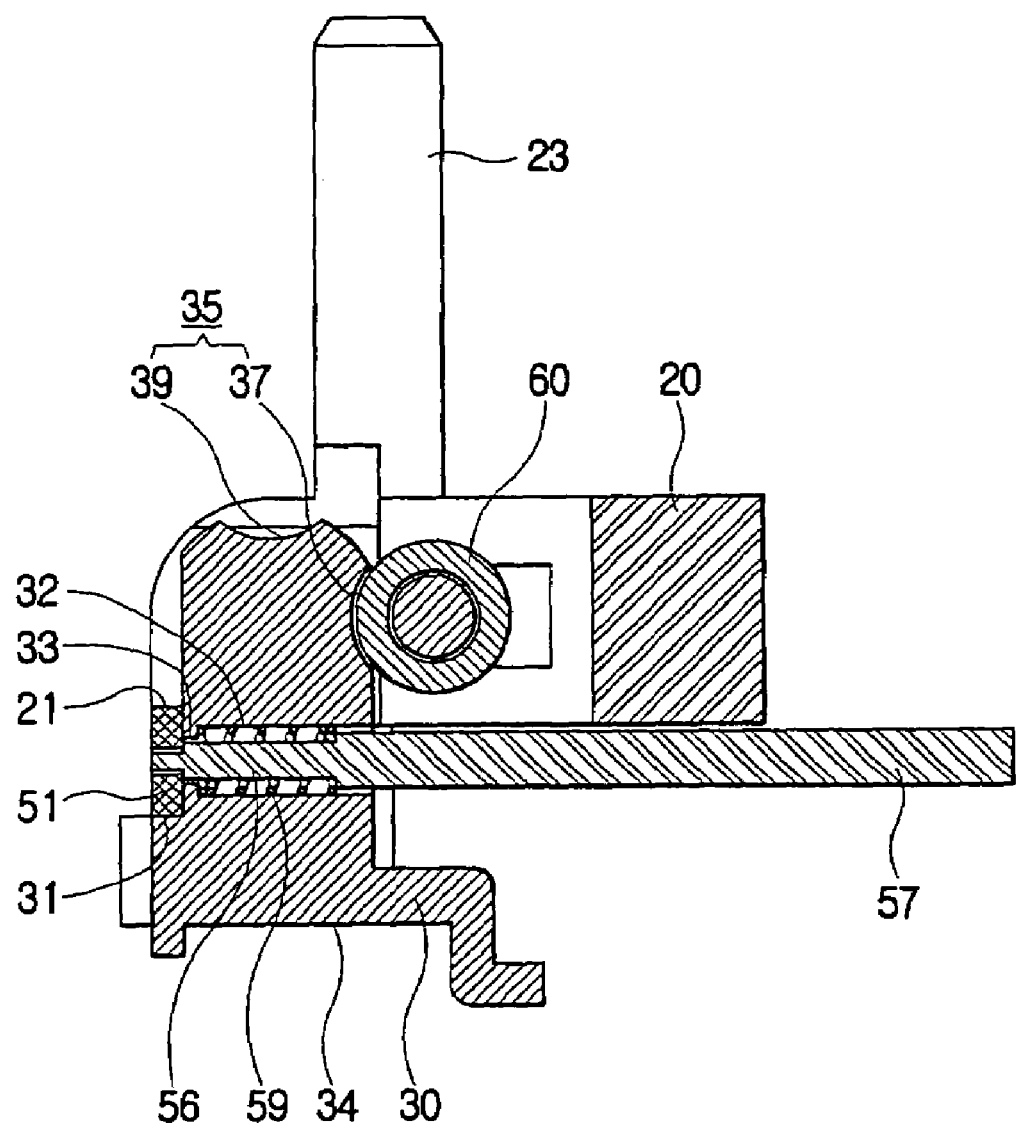
FIGS. 5 and 6 are sectional views illustrating an operation of the monitor apparatus.
Figure 6:
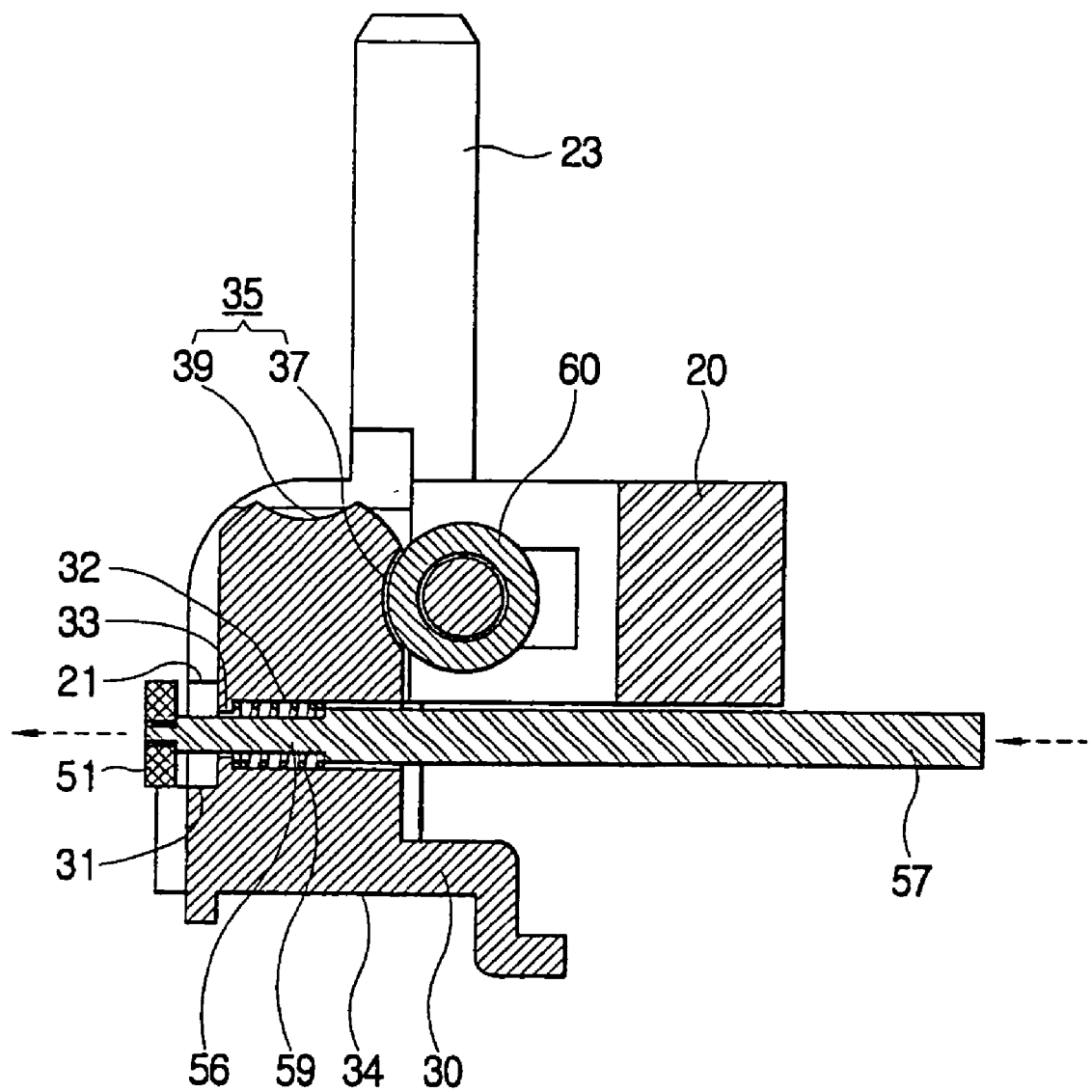
Figure 7:
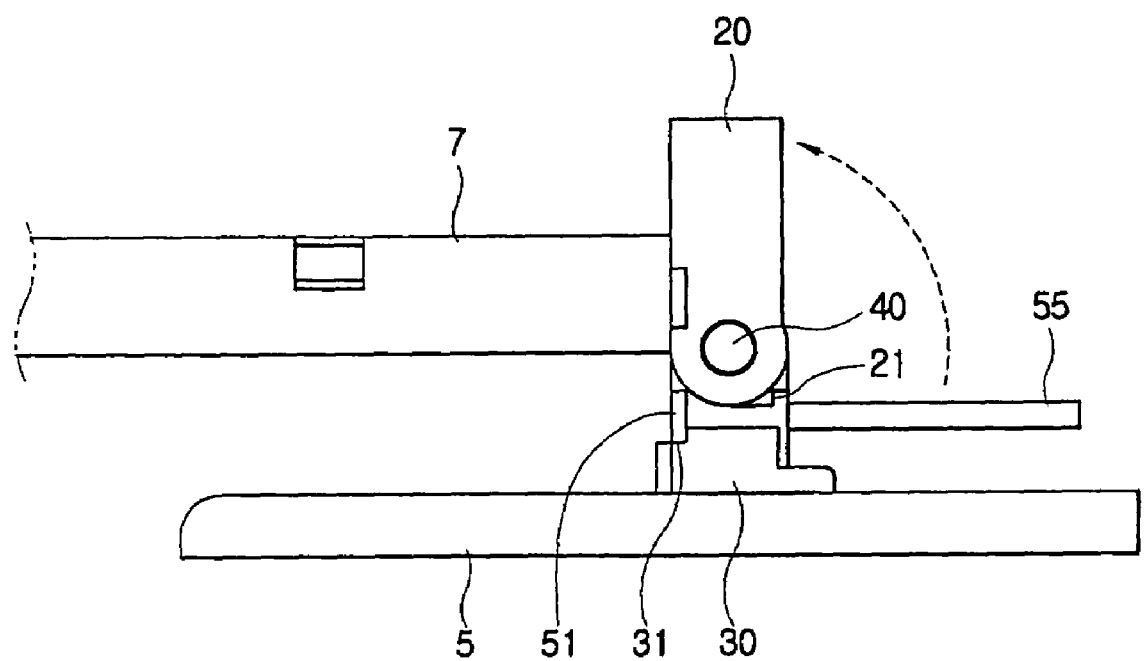
FIG. 7 is a side view illustrating the monitor apparatus in a folded state.

In light of the above-described configuration, as shown in FIGS. 5 through 7, the monitor apparatus 1 according to the embodiment of the present invention is operated as follows.

When the stand member 7 is approximately stood up in an upright position on an upper surface of the base member 5 for the user to watch the monitor main body 3, the stopper 51 is placed between the first and second rotation preventing parts 21 and 31, thereby preventing a rotation of the stand member 7 relative to the base member 5. Here, the roller 60 is accommodated in the first roller accommodating groove 37 of the hinge shaft accommodating part 35 (refer to FIG. 5).

As shown in FIG. 5, the stand member 7 is rotated relative to the base member 5 and folded as follows. At first, the operating part 57 of the operating lever 55 is pushed forward by overcoming the elastic force of the coil spring 59 and then, the stopper 51 combined with the operating lever 55 as a single body is separated from the first and second rotation preventing parts 21 and 31 (refer to FIG. 6). Thereafter, if the stand member 7 is pushed forwardly, the stand bracket 20 is rotated forwardly about the hinge shaft 40, and the stand member 7 is folded on the upper surface of the base member 7. Here, the roller 60 becomes in rolling-contact with the circumferential surface of the hinge shaft accommodating part 35 and is accommodated in the second roller accommodating groove 39 of the hinge shaft accommodating part 35 (refer to FIG. 7).

As shown in FIG. 7, the stand member 7 is stood up relative to the base member 5, if the stand member 7 is pushed upwardly and rotated upwardly relative to the base member 5. If the stand member 7 is stood up approximately in the upright position relative to the base member 5, then the stopper 51 is located between the first and second rotation preventing parts 21 and 31 by the coil spring 51. Here, the roller 60 is accommodated in the first roller accommodating groove 37 again.

The monitor apparatus 1 is provided with the base hinge 15 to combine the stand member 7 to the base member 5, so that the stand member 7 may be rotated relative to the base member 5 and folded. Thus, the user may fold the stand member 7 relative to the base member 5 by pushing the stand member 7 forwardly, so that a package volume thereof is reduced and the cost to keep and move the monitor apparatus 1 is saved. Further, the monitor apparatus 1 is provided with the rotation control unit 50 to allow and prevent the rotation of the stand member 7 relative to the base member 5, so that the rotation of the stand member 7 is allowed as needed. Thus, an accident occurring when the stand member 7 is suddenly rotated due to a weight of the monitor main body 3 or an external force, may be prevented.

Further, the roller 60 and the hinge accommodating part 35 are provided, so that the roller 60 is in rolling-contact to the circumferential surface of the hinge accommodating part 35 when the stand bracket 20 is rotated relative to the base bracket 30. Moreover, the roller 60 is pushed forwardly by the elastic members 63. Thus, the stand member 7 may be more stably rotated relative to the base member 5 without being shaken.

Further, the circumferential surface of the hinge shaft accommodating part 35 is provided with the first and second roller accommodating grooves 37 and 39, so that the roller 60 is accommodated in the first roller accommodating groove 37, and the rotation of the stand member 7 is prevented when the stand member 7 is stood up relative to the base member 5. Thus, the stand member 7 is not shaken relative to the base member 5 when a tilting angle of the monitor main body 3 is adjusted. When the stand member 7 is folded, the roller 60 is accommodated in the second roller accommodating groove 39 and the rotation of the stand member 7 is prevented. Thus, the stand member 7 is not rotated backward and shaken when the monitor apparatus 1 is packed or moved.

As described above, according to the present invention, a package volume is reduced, so that the cost to keep and move the monitor apparatus is saved and an accident occurring when the stand member is suddenly rotated may be prevented.

Further, the roller in rolling-contact with the hinge shaft accommodating part and the elastic members pushing the roller toward the hinge shaft accommodating part, are provided so that the stand member may be more stably rotated relative to the base member without being shaken.

Further, the circumferential surface of the hinge shaft accommodating part is provided with the first and second roller accommodating grooves, thereby preventing the stand member from being shaken or rotated relative to the base member when the tilting angle of the monitor main body is adjusted or moved.

Although a few embodiments of the present invention have been shown and described, it will be appreciated by those skilled in the art that changes may be made in these embodiments without departing from the principles and spirit of the invention, the scope of which is defined in the appended

What is claimed is:

1. A monitor apparatus includes a monitor main body, and a base member to support the monitor main body, the monitor apparatus comprising:
    a stand member placed between the monitor main body and the base member;
    a base hinge to connect the stand member to the base member, so that the stand member is rotated relative to the base member and folded; and
    a rotation control unit to be moveably connected to the base hinge and to prevent and allow a rotation of the stand member relative to the base member,
    wherein the base hinge comprises a base bracket combined to the base member, a stand bracket combined to the stand member and a hinge shaft to rotatably support the stand bracket relative to the base member, and
    the rotation control unit comprises:
        a first rotation preventing part provided at the stand bracket,
        a second rotation preventing part provided at the base bracket,
        a stopper provided between the first and second rotation preventing parts, to prevent the stand bracket from being rotated relative to the base bracket, and
        an operating lever to separate the stopper from a space between the first and second rotation preventing parts, so that the stand bracket is rotated relative to the base bracket.

2. The monitor apparatus according to claim 1, wherein the first and second rotation preventing parts are provided in front of the stand bracket and the base bracket, respectively.

3. The monitor apparatus according to claim 2, wherein one end of the operating lever is combined to the stopper, and the other end thereof protrudes toward a backside of the base hinge.

4. The monitor apparatus according to claim 3, wherein the rotation control unit further comprises:
    a spring member to supply an elastic force, so that the stopper is located between the first and second rotation preventing parts.

5. The monitor apparatus according to claim 4, wherein the operating lever passes through the base bracket in backward and frontward directions.

6. The monitor apparatus according to claim 5, wherein the spring member comprises:
    a coil spring having a first end supported by the base bracket and a second end supported by the operating lever, to push the operating lever backward.

7. A monitor apparatus includes a monitor main body, and a base member to support the monitor main body, the motor apparatus comprising:
    a stand member placed between the monitor main body and the base member;
    a base hinge to connect the stand member to the base member, so that the stand member is rotated relative to the base member and folded; and
    a rotation control unit to be moveably connected to the base hinge and to prevent and allow a rotation of the stand member relative to the base member,
    wherein the base hinge comprises a base bracket combined to the base member, a stand bracket combined to the stand member, a hinge shaft to rotatably support the stand bracket relative to the base member and a roller combined to the base bracket and in rolling-contact with a part of the base bracket when the stand bracket is rotated relative to the base bracket.

8. The monitor apparatus according to claim 4, further comprising:
    a roller combined to the base bracket and in rolling-contact with a part of the base bracket when the stand bracket is rotated relative to the base bracket.

9. The monitor apparatus according to claim 7, further comprising:
    a pair of hinge shaft supporting parts provided on opposite sides of the stand bracket, to support the hinge shaft.

10. The monitor apparatus according to claim 9, wherein the base bracket comprises:
    a hinge shaft accommodating part provided between the pair of hinge shaft supporting parts, to accommodate the hinge shaft.

11. The monitor apparatus according to claim 10, wherein the hinge shaft accommodating part comprises:
a circumferential surface, a part of the a circumferential surface of the hinge shaft accommodating part being formed with a groove of an arc section in rolling-contact with the roller.

12. The monitor apparatus according to claim 11, further comprising:
a roller rotation shaft to protrude from opposite sides of the roller.

13. The monitor apparatus according to claim 12, wherein the stand bracket comprises:
a pair of stand combining parts provided with a plurality of combining holes, to combine the stand combining parts with a lower part of the stand member;
a roller accommodating part provided between the pair of hinge shaft supporting parts, to accommodate the roller; and
a rotation shaft supporting part to support the roller rotation shaft.

14. The monitor apparatus according to claim 13, wherein the rotation shaft supporting part comprises:
an elastic member to push the roller in a direction of the hinge shaft accommodating part.

15. The monitor apparatus according to claim 14, wherein the circumferential surface of the hinge shaft accommodating part comprises:
a first roller accommodating groove to accommodate the roller when the stand member is stood up relative to the base member; and
a second roller accommodating groove to accommodate the roller when the stand member is rotated relative to the base member and folded.

16. The monitor apparatus according to claim 10, wherein the pair of hinge shaft supporting parts comprise:
a pair of first shaft inserting holes to insert the hinge shaft therein along an axial line of a rotation of the stand member.

17. The monitor apparatus according to claim 16, wherein the hinge shaft accommodating part comprises:
a pair of second shaft inserting holes to insert the hinge shaft therein along an axial line of a rotation of the stand member.

18. The monitor apparatus according to claim 17, wherein the hinge shaft comprises:
a pair of hinge shafts, each of the pair of hinge shafts being securely inserted in the pair of first shaft inserting holes and rotatable in the pair of second shaft inserting holes.

19. The monitor apparatus according to claim 17, wherein the hinge shaft comprises:
a pair of hinge shafts, each of the pair of hinge shafts being rotatably inserted in the pair of first shaft inserting holes and secured in the pair of second shaft inserting holes.

20. A supporting apparatus comprising:
a stand member to support a monitor main body, the stand member being placed between the monitor main body and a base member;
a base hinge to connect the stand member to the base member, so that the stand member is rotated relative to the base member and folded; and
a rotation control unit to prevent and allow the stand member to be rotated relative to the base member by pushing the rotation control unit,
wherein the base hinge comprises a base bracket combined to the base member, a stand bracket combined to the stand member and a hinge shaft to rotatably support the stand bracket relative to the base member, and the rotation control unit comprises:
a first rotation preventing part provided at the stand bracket,
a second rotation preventing part provided at the base bracket,
a stopper provided between the first and second rotation preventing parts, to prevent the stand bracket from being rotated relative to the base bracket, and
an operating lever to separate the stopper from a space between the first and second rotation preventing parts, so that the stand bracket is rotated relative to the base bracket.

21. The supporting apparatus according to claim 20, wherein the rotation control unit further comprises:
a spring member to supply an elastic force, so that the stopper is located between the first and second rotation preventing parts.

22. A supporting apparatus comprising:
a stand member to support a monitor main body, the stand member being placed between the monitor main body and a base member,
a base hinge to connect the stand member to the base member, so that the stand member is rotated relative to the base member and folded; and
a rotation control unit to prevent and allow the stand member to be rotated relative to the base member by pushing the rotation control unit,
wherein the base hinge comprises a base bracket combined to the base member, a stand bracket combined to the stand member, a hinge shaft to rotatably support the stand bracket relative to the base member and a roller combined to the base bracket and in rolling-contact with a part of the base bracket when the stand bracket is rotated relative to the base bracket.

23. The supporting apparatus according to claim 22, further comprising:
a pair of hinge shaft supporting parts provided on opposite sides of the stand bracket, to support the hinge shaft.

24. The supporting apparatus according to claim 23, wherein the base bracket comprises:
a hinge shaft accommodating part provided between the pair of hinge shaft supporting parts, to accommodate the hinge shaft.

25. The supporting apparatus according to claim 24, wherein the hinge shaft accommodating part comprises:
a circumferential surface, a part of the a circumferential surface of the hinge shaft accommodating part being formed with a groove of an arc section in rolling-contact with the roller.

26. The supporting apparatus according to claim 25, wherein the stand bracket comprises:
a pair of stand combining parts provided with a plurality of combining holes, to combine the stand combining parts with a lower part of the stand member; and
a roller accommodating part provided between the pair of hinge shaft supporting parts, to accommodate the roller.

27. The supporting apparatus according to claim 26, wherein the circumferential surface of the hinge shaft accommodating part comprises:
a first roller accommodating groove to accommodate the roller when the stand member is stood up relative to the base member; and
a second roller accommodating groove to accommodate the roller when the stand member is rotated relative to the base member and folded.

28. The supporting apparatus according to claim 24, wherein the pair of hinge shaft supporting parts comprise a pair of first shaft inserting holes to insert the hinge shaft therein along an axial line of a rotation of the stand member; and the hinge shaft accommodating part comprises a pair of second shaft inserting holes to insert the hinge shaft therein along an axial line of a rotation of the stand member.

29. The supporting apparatus according to claim 28, wherein the hinge shaft comprises:

a pair of hinge shafts, each of the pair of hinge shafts being securely inserted in the pair of first shaft inserting holes and being rotatably inserted in the pair of second shaft inserting holes.

30. The supporting apparatus according to claim 28, wherein the hinge shaft comprises:

a pair of hinge shafts, each of the pair of hinge shafts being rotatably inserted in the pair of first shaft inserting holes and being secured in the pair of second shaft inserting holes.

* * * * *

UNITED STATES PATENT AND TRADEMARK OFFICE
CERTIFICATE OF CORRECTION

PATENT NO. : 7,370,838 B2 Page 1 of 1
APPLICATION NO. : 10/786235
DATED : May 13, 2008
INVENTOR(S) : Jun-soo Jeong et al.

It is certified that error appears in the above-identified patent and that said Letters Patent is hereby corrected as shown below:

Column 8, Line 34, change "motor" to --monitor--.

Column 9, Line 3, after "the" delete "a".

Column 10, Line 21, change "member," to --member;--.

Column 10, Line 46, after "the" delete "a".

Signed and Sealed this

Sixteenth Day of September, 2008

JON W. DUDAS
*Director of the United States Patent and Trademark Office*